United States Patent
Holmberg

(10) Patent No.: US 10,889,083 B2
(45) Date of Patent: Jan. 12, 2021

(54) SYNTHETIC PEEL OUT ID CARD AND METHOD OF MAKING THE SAME

(71) Applicant: HOLMBERG COMPANY, INC., Minneapolis, MN (US)

(72) Inventor: Tom Holmberg, Minneapolis, MN (US)

( * ) Notice: Subject to any disclaimer, the term of this patent is extended or adjusted under 35 U.S.C. 154(b) by 0 days.

(21) Appl. No.: 16/142,339

(22) Filed: Sep. 26, 2018

(65) Prior Publication Data

US 2019/0091965 A1 Mar. 28, 2019

Related U.S. Application Data

(60) Provisional application No. 62/563,218, filed on Sep. 26, 2017.

(51) Int. Cl.
| | | |
|---|---|---|
| B32B 3/30 | (2006.01) | |
| B32B 3/26 | (2006.01) | |
| B32B 29/00 | (2006.01) | |
| B32B 38/00 | (2006.01) | |
| B32B 7/12 | (2006.01) | |
| B32B 37/12 | (2006.01) | |
| B42D 5/02 | (2006.01) | |
| B42D 15/00 | (2006.01) | |
| B42D 25/22 | (2014.01) | |

(52) U.S. Cl.
CPC ............ *B32B 3/266* (2013.01); *B32B 7/12* (2013.01); *B32B 29/002* (2013.01); *B32B 37/12* (2013.01); *B32B 38/0004* (2013.01); *B42D 5/027* (2013.01); *B42D 15/006* (2013.01); *B42D 25/22* (2014.10); *B32B 2425/00* (2013.01)

(58) Field of Classification Search
CPC ........... Y10T 428/14; Y10T 428/24322; B32B 3/266; B32B 3/30; B32B 7/12; B32B 2425/00; B42D 5/027; B42D 25/22
See application file for complete search history.

(56) References Cited

U.S. PATENT DOCUMENTS

| | | | |
|---|---|---|---|
| 5,320,387 A | 6/1994 | Carlson | |
| 5,403,236 A | 4/1995 | Greig | |
| 6,569,280 B1 * | 5/2003 | Mehta | B42D 5/027 156/247 |
| 6,688,649 B2 * | 2/2004 | Casagrande | G09F 3/0288 206/449 |
| 6,749,230 B1 | 6/2004 | Casagrande | |

* cited by examiner

*Primary Examiner* — Alexander S Thomas
(74) *Attorney, Agent, or Firm* — Greg N. Geiser; Gutwein Law

(57) ABSTRACT

Described herein is form assembly having a removable and synthetic peel out identification card and a method of making the same. The assembly is generally comprised of a laminate of a first planar form layer having an at least one aperture, a first planar layer of synthetic material, and a second planar layer of synthetic material forming the identification card. The first planar layer of synthetic material is applied to a second side of the first planar form layer across the width and over the at least one aperture forming a backer. The second planar layer of the synthetic material is placed within the at least one aperture and secured to the first planar layer of synthetic material. A controlled depth cut is then made to a second side of the first planar layer of synthetic material within a perimeter of the second planar layer of synthetic material to allow for the selective release of the second planar layer of synthetic material from the form.

2 Claims, 3 Drawing Sheets

SYNTHETIC PEEL OUT ID CARD AND METHOD OF MAKING THE SAME

CROSS REFERENCE TO RELATED APPLICATIONS

This application claims priority to U.S. Provisional Patent Application No. 62/563,218 filed 26 Sep. 2017 to the above named inventor, and is herein incorporated by reference in its entirety.

FEDERALLY SPONSORED RESEARCH OR DEVELOPMENT

Not Applicable

SEQUENCE LISTING, A TABLE, OR A COMPUTER PROGRAM

Not Applicable

FIELD OF THE INVENTION

The present disclosure relates generally to a paper and film construction useful in forming a peel out identification card or cards.

BACKGROUND

Within the prior art there exist methods related to printable coplanar laminates. In particular, U.S. Pat. No. 5,320,387 to Carlson and U.S. Pat. No. 5,403,236 to Greig disclose several laminate structures and methods for making the same, utilizing a film layer, an adhesive layer, a sheetstock material having an aperture, and a plastic card member configured for removable placement into the aperture for generally forming a printable laminate having a removable card member.

Further, U.S. Pat. No. 6,749,230 to Casagrande discloses an improvement on the above listed references generally forming an improved card laminate structure providing a backer layer in the form of a patch that is received on a backside of a form layer having an aperture for the placement of a card and having a size slightly larger than the aperture. Generally, this '230 reference includes a perforated cut through this backer layer to allow for the removal of the card.

These assemblies while generally being capable of producing a card within a form layer, due have some disadvantages. Often the perforated cut is difficult to separate from the backer layer and may result in an undesirable uneven edge. Additionally, these assemblies can often be too thick for adequate processing and result in a card that is difficult to remove. Accordingly, there is a need within the marketplace for an improved removal card laminate structure that does not include the deficiencies found within the prior art.

SUMMARY OF THE INVENTION

The disclosure provides a coplanar laminate constructed from a paper form, such as a sheetstock, a synthetic backer layer, an adhesive layer, and a card layer providing a configuration that allows for the removal of the card layer by a user from the laminate after processing.

The laminate of the present disclosure, is preferably constructed out of a paper web having the properties of a 90# index stock material. An aperture sized for the placement of an intended identification (ID) type card is cut (preferably through a die cut) into the paper web, with the cut out material removed from the web.

On an additional web, a second material in the form of synthetic backer material having a width slightly larger than the aperture previously placed within the paper web is coated on one side with an adhesive and mated along a dimension of the paper web to cover the aperture and extending between opposed edges of the paper web.

On an additional web, a third material in the form of synthetic material having a heavier basis weight than the second material and adapted to form the ID card of the laminate is positioned for placement within the aperture.

The three materials are then assembled into a laminate, wherein the third material is aligned with aperture and correspondingly cut in place to a final shape and placed into the aperture and configured for bonding through compression during the cut in place process with the second backer material.

This mated assembly is then subjected to a controlled depth cut within the aperture and within the perimeter of the third material, wherein the depth of cut extends through only the second material. Accordingly, the third material can now be removed from the second material backer upon demand.

DETAILED DESCRIPTION OF THE INVENTION

Figure 1:
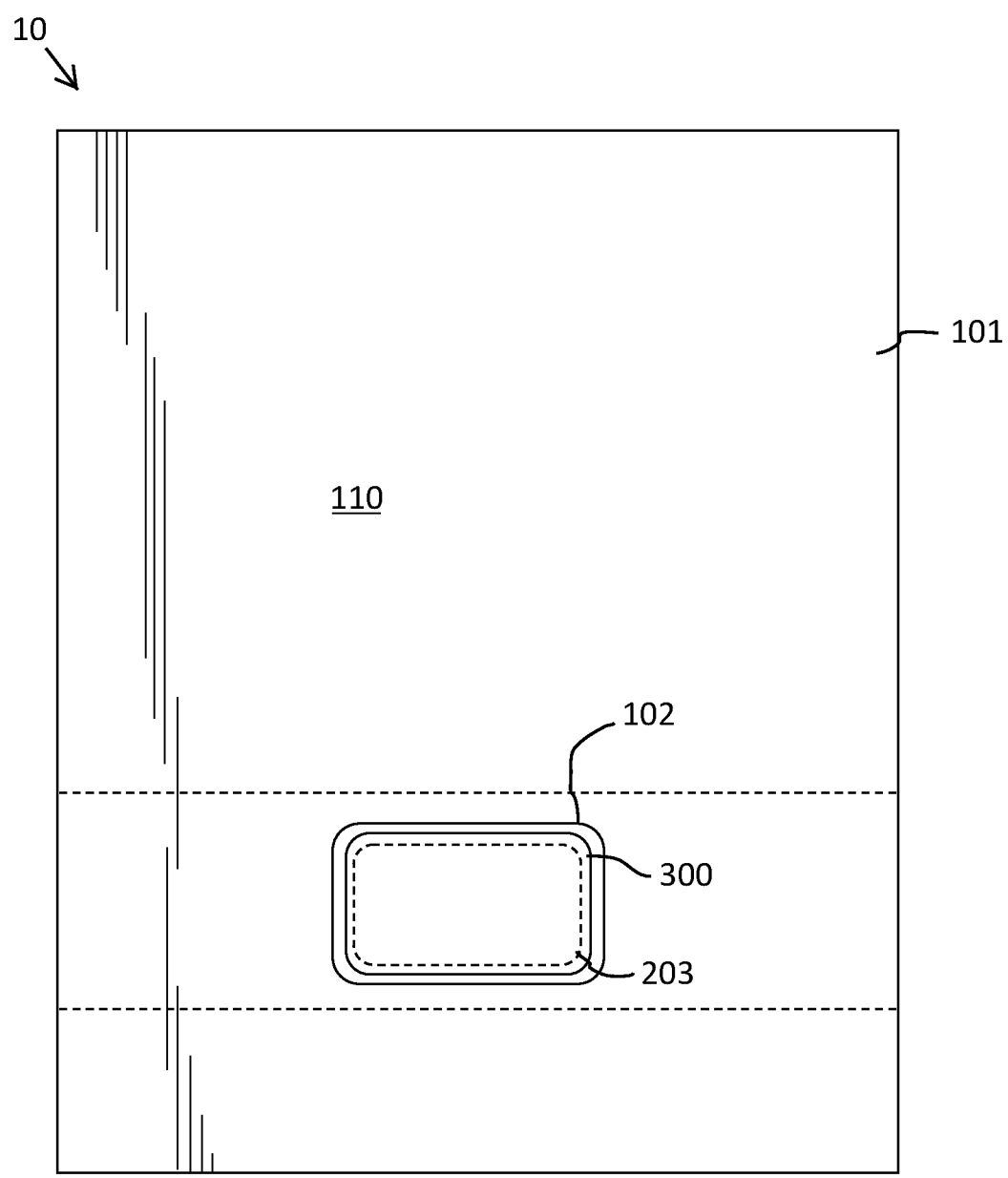
FIG. 1 shows a rear side view of a laminate assembly, according to the present disclosure.

The following detailed description includes references to the accompanying drawings, which forms a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances Furthermore, the recitation of one or more preferred embodiments does not imply that other embodiments are not useful, and is not intended to exclude other embodiments from the scope of the invention.

As used herein, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The present disclosure relates generally to a laminate assembly formation configured to allow for the placement and removal of a synthetic card member from the assembly and a method of making the same. The disclosed assembly, can be produced in multiple sizes and configurations and utilize several material types, dimensions, and thicknesses without departing from the spirit and breadth of the disclosure.

Figure 2:
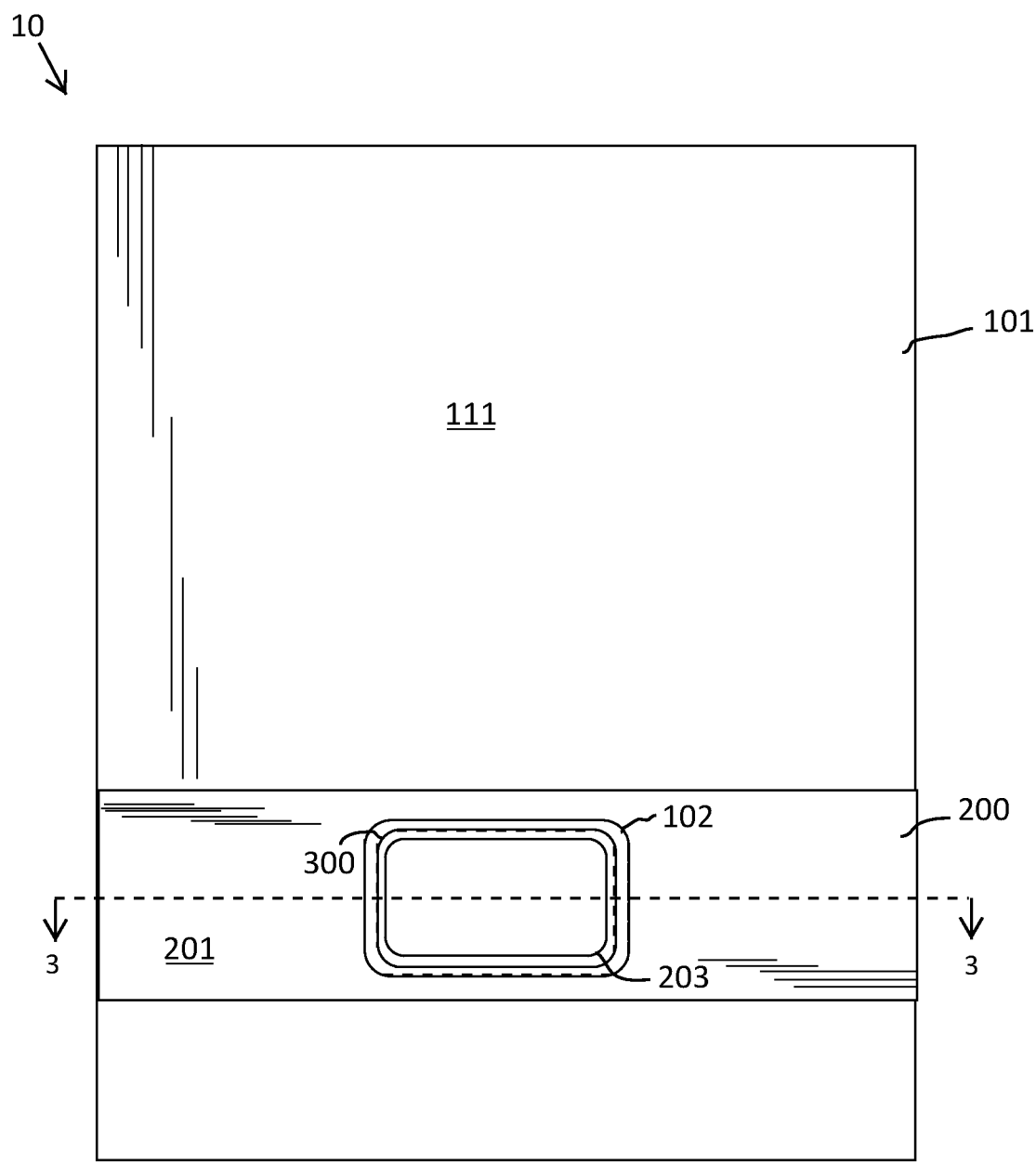
FIG. 2 shows a front side view of the laminate assembly, according to the present disclosure.
Figure 3:
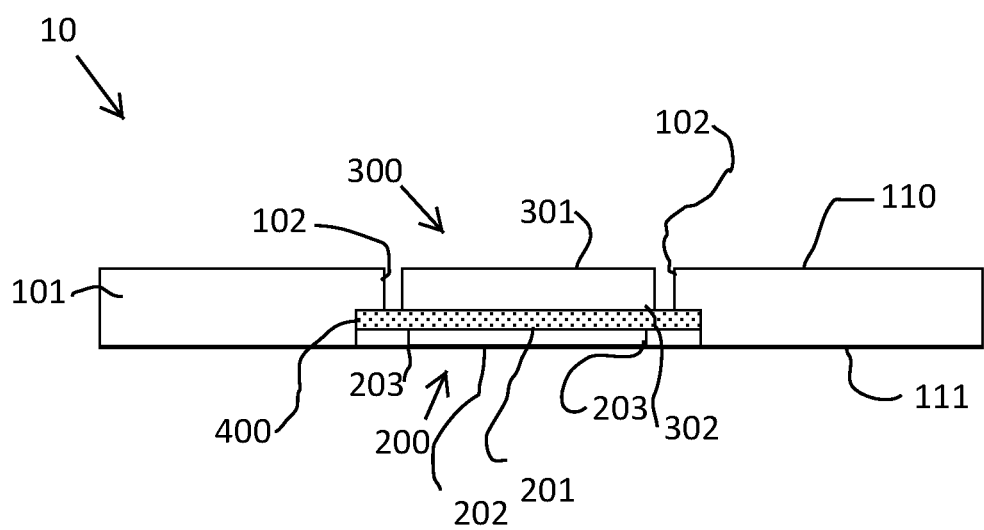
FIG. 3 shows a cross-sectional view of the laminate assembly along section 3-3 of FIG. 2, according to the present disclosure.

Referring now to FIGS. 1-3 of the laminate of the present disclosure identified herein as a synthetic peel out ID card laminate and method of making the same. The laminate is generally referred to as form 10. The form 10 is comprised of a first planar form layer 101 having a first side 110 and a second side 111. The first planar form layer 101 comprised of a sheetstock material. Preferably, the first planar form layer 101 is a 90# (90 lb.) index paper and provided on a roll for converting.

The first planar form layer 101 is converted first with at least one aperture 102. The at least one aperture 102 generally provided through a die cut and representing a hole within the first planar form layer 101. The at least one aperture 102 having a size selected for the receipt of a synthetic layer 300 designated as a second planar layer of synthetic material and configured as the peel out ID card layer of the form 10, wherein the at least one aperture 102 is configured with a perimeter having a size and shape selected to be slightly larger than the finalized shape and size of a perimeter of the synthetic layer 300.

Preferably, the at least one aperture 102 is a rectangle having a width and a length 0.030"×0.030" larger than the rectangular perimeter of the synthetic layer 300 with this distance representing a small gap between the at least one aperture 102 and synthetic layer 300. Although, the preferred gap is 0.030", a smaller or larger gap can be utilized. For optimal processing, it is preferred that width and the length of the at least one aperture 102 is less than 0.0060" larger than the synthetic layer 300 to prevent adjacent stacked forms 10 from sticking together. The at least one aperture 102 is illustrative of a form 10 having a single aperture, although the form 10 can be provided with a plurality of apertures for the placement of several synthetic layers within the first planar form layer 101.

The addition of the at least one aperture 102 to the first planar form layer 101 results in the creation of a waste material representing the removed material in the creation of the at least one aperture 102, this removed material is discarded.

A second material 200 designated as a first planar layer of synthetic material in the form of a thin synthetic web is placed upon the second side 111 of the first planar form layer 101 over the aperture 102 to form a backer extending a width of the first planar form layer 101 and a height corresponding to a dimension greater than the height of the aperture 102. Preferably, the second material 200 is comprised of a polyester film having a thickness of 1 mil (0.001"). Although a thickness of 1 mil is preferred, the second material thickness can be between 1 mil (0.001") and 3 mils (0.003") depending upon the application without significant impact on processing. The second material 200 may be clear, matte, gloss, or opaque depending upon the type of application and design.

The placement of the second material 200 is configured for placement across the width of the first planar form layer 101 as a strip with the strip width being wider than the aperture 102 when placed. Accordingly, the aperture 102 is completely covered by the second material 200 along the second side 111. Preferably, the second material 200 is approximately ¼" wider along the width of the aperture 102 when placed. For a typical sized ID card, this width will be 2.5" (two and one-half inches).

Prior to placement on the first planar form layer 101 an adhesive 400 is applied to a first side 201 of the second material 200, wherein the adhesive 400 is adapted to secure the second material 200 to the first material 101 and the synthetic layer 300. To provide increased adhesion of the adhesive 400, the second material 200 may be treated, wherein the second material 200 first side 201 is treated to before coming in contact with the adhesive 400 to be more receptive to bonding with the adhesive 400.

The adhesive 400 is generally and specifically adapted for securing the second material 200 over the at least one aperture 102 and securing to the synthetic layer 300. The adhesive 400 generally selected from the class of water based acrylic adhesives. The adhesive 400 may be enhanced through an additive. The adhesive 400 can be provided in multiple types adapted to provide the desired result. Accordingly, the adhesive 400 is adapted to permanently bond the second material 200 and removably adhere to an outer perimeter portion of the synthetic layer 300. In a preferred assembly, the adhesive 400 is a heat activated ethylene-vinyl acetate (EVA), as this adhesive type has shown to have adequate adhesion strength while also leaving no residue during use of the form 10.

The synthetic layer 300 is comprised of a material typically of a heavier basis weight than the second material 200 and configured as the ID card of the from 10 and having a first side 301 and second side 302. In converting, the synthetic layer 300 is provided in a continuous roll and unwound for placement over the at least one aperture 102 where it is fed into an assembly adapted to cut the shape of the ID card from the synthetic layer 300 and compress the synthetic layer 300 second side 302 into the adhesive 400 and onto the first side 201 of the second layer 200 in a lamination and forming an integral card within the at least one aperture 102. During this process of cutting, a waste matrix is created that is removed from the assembly. In the preferred embodiment of the disclosure, the synthetic layer 300 is comprised of material having a thickness of 7 mil (0.007"). Although a thickness of 7 mil is preferred, the synthetic layer 300 can of thickness of between 5 mil (0.005") and 10 mil (0.010") without significant issues with converting and assembly.

The lamination of the assembly of the synthetic layer 300, adhesive 400, and second material 200 within the at least one aperture 102 of the first planar form layer 101 is then further converted with a cut 203 through a second side 202 of the second material 200 within a space of the perimeter of the synthetic material 300 and within the aperture 102 after bonding. The cut 203 is of a controlled depth and though the entire thickness of second material 200 to the synthetic layer 300 second side 302. Preferably, the cut 203 is continuous around the entire perimeter of the synthetic material 300 and 0.030" smaller than the synthetic material 300 perimeter. The cut 203 may be conducted through the use of a die cutter or a laser cutter.

The final converting step in the form 10 is the cutting of first planar form layer 101 to its desired width and length.

In the preferred laminate of the present disclosure, the form 10 is assembled in manner and with materials selected to prepare a stacked final assembly that is substantially even and level for further processing in a device, such as a printer. To further facilitate this leveling the form 10 may be converted with additional steps during the assembly and lamination process.

In a first method, the form 10 may be recessed in a dimension corresponding to the thickness and width of the second material 200, wherein the second material 200 is placed within this recess during assembly and lamination. Preferably, this recess is calendared into the second side 111 of the first material.

In a second method for leveling the form 10, embossed dots are added around a perimeter of the form 10. The embossed dots representing a generally raised node on the surface of the form standing out in relief. Accordingly, the embossed dots are offset from each other to compensate for a bias in the final form 10 assembly.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed:

1. A form with a removable card, the form comprising:
   a first planar form layer having a first side, a second side, a width, and a thickness extending from the first side to the second side, the first planar form layer having at least one aperture and including a plurality of embossed dots, the at least one aperture through the thickness from the first side to the second side, the at least one aperture bordered by a continuous cut through the form layer;
   a first planar layer of synthetic material, the first planar layer of synthetic material having a first side and a second side, the first side including an adhesive to adhesively adhere to the second side of the first planar form layer extending the width of the first planar form layer and over the at least one aperture;
   a second planar layer of synthetic material forming the removable card, the second planar layer of synthetic material having a first side and a second side, the second planar layer of synthetic material placed within the aperture, the second side adhered to the first side of the first planar layer of synthetic material within the at least one aperture; and
   a controlled depth cut, the controlled depth cut through the first planar synthetic material thickness extending from the second side to the first side and within the perimeter of the second planar layer of synthetic material.

2. A form with a removable card, the form comprising:
   a first planar form layer having a first side, a second side, a width, and a thickness extending from the first side to the second side, the first planar form layer having at least one aperture and including a plurality of embossed dots, the at least one aperture through the thickness from the first side to the second side, the at least one aperture bordered by a continuous cut through the form layer;
   a first planar layer of synthetic material forming a strip, the first planar layer of synthetic material having a first side and a second side, the first side including an adhesive to adhesively adhere to the second side of the first planar form layer extending the width of the first planar form layer and over the at least one aperture;
   a second planar layer of synthetic material forming the removable card and having a perimeter, a first side and a second side, the second planar layer of synthetic material placed within the aperture, the second side adhered to the first side of the first planar layer of synthetic material within the at least one aperture, wherein a gap between the first planar form layer and the second planar layer is formed around the perimeter; and
   a continuous controlled depth cut, the controlled depth cut through the first planar synthetic material thickness extending from the second side to the first side and within the perimeter of the second planar layer of synthetic material.

\* \* \* \* \*